Dec. 15, 1936. H. L. GORDON 2,064,377
NUT TO CARRY LUBRICANT
Filed Feb. 20, 1936
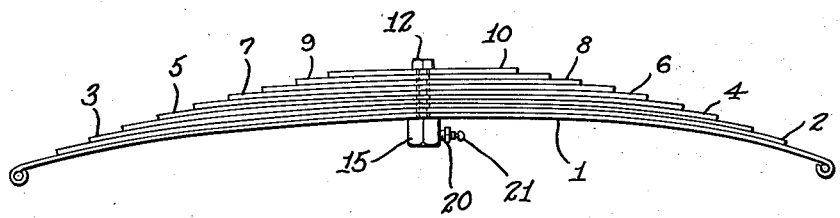
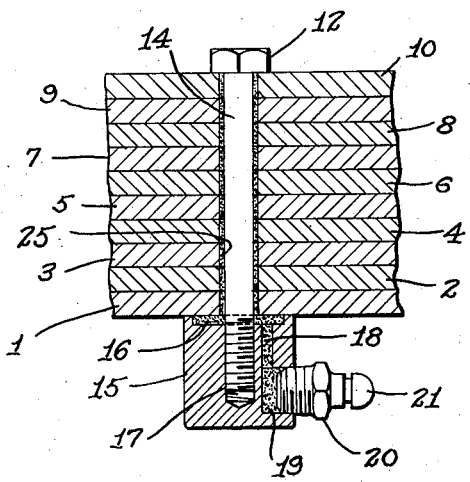

Patented Dec. 15, 1936

2,064,377

UNITED STATES PATENT OFFICE 2,064,377

NUT TO CARRY LUBRICANT

Herman L. Gordon, Winthrop, Mass., assignor of one-half to Charles Wennett, Boston, Mass.

Application February 20, 1936, Serial No. 64,837

1 Claim. (Cl. 267—50)

My present invention is a novel and improved nut adapted to replace the usual standard type of nut on a bolt, particularly for bolts thru automobile springs and the like, with provision to carry lubricating material and with a fixture for attachment to a source of lubricant under pressure such as a pump or in the well known so-called Alemite system.

My invention is of special importance in connection with automobile springs such as used on Ford automobiles where it is extremely difficult to supply lubrication in the springs and which necessitates removal of the springs or the body to substitute a new bolt.

By means of my invention I am enabled instantly and with unskilled labor to back off the usual or normal nut on a spring-holding bolt and to instantly apply my improved device with a channel for lubricant and an attachment, valve, and connections to enable lubricant under pressure to be supplied. Furthermore, the yielding of the springs effects a pumping action to aid in forcing the lubricant upwardly around the shank of the bolt and laterally thru the various leaves of the spring.

Referring to the drawing illustrating a preferred embodiment of the present invention, Fig. 1 is a typical showing of a set of springs such as utilized in automobile construction, particularly smaller cars such as Fords.

Fig. 2 is an enlarged cross-sectional fragmentary view.

As shown in the drawing, a typical set of springs with a plurality of leaves 1, 2, 3, 4, 5, 6, 7, 8, and 9 are illustrated, which of course may be of any number, and a bolt having a head 12 and shank 14 pass thru openings thru each of the leaves, and the same are held together by an ordinary nut threaded on the bottom of the shank 14. One or more of such bolts may be utilized.

I provide a new lubricating nut 15 threaded to fit on the threaded portion of the shank 14 of the bolt, removing the original nut and replacing the same with my lubricating nut. This improved nut is of substantial size and is formed with a lubricant-receiving opening 16 at the upper or top portion entirely encircling the opening for the shank 14, and is provided at one side of the tapped recess 17 which is threaded onto the shank 14 with a conduit 18 opening into a bottom recess 19 which is tapped to receive the correspondingly threaded portion of a valve 20, having an Alemite fitting 21 on said valve for connection with a power lubricating pump or supply.

Thus in my improved construction by the simple backing off of the original nut on the shank 14 and replacement by threading on my improved lubricating nut 15 an instantaneous change is made, enabling lubricant to be supplied under pressure to the recess 19, conduit 18, and the opening 16, forcing the lubricant 25 under pressure in the same and up and around the space between the shank 14 and the openings in the spring leaves, from whence the lubricant will work thru between the leaves of the spring.

The opening 16 and recess 19 may be of considerable size and capacity to receive and hold a quantity of lubricant which, when forced in under pressure, would constitute a supply for a considerable length of time.

I claim:

A lubricating nut for attachment to a standard spring-holding bolt formed of substantially greater length than that of the original nut which it replaces, and comprising four recesses: a central tapped recess extending partly thru the length of the nut and adapted to be threaded onto the correspondingly threaded end of the bolt, a counterbored recess of greater diameter than the bolt to receive lubricant at the open end of said center tapped recess, a longitudinally formed recess parallel to the center tapped recess and opening into the counterbored recess to conduct lubricant thereto, and a laterally tapped opening from said longitudinal recess to hold a valve fixture for receiving a supply of lubricant therethru.

HERMAN L. GORDON.